(12) United States Patent
Chen

(10) Patent No.: US 7,484,970 B1
(45) Date of Patent: Feb. 3, 2009

(54) ELECTRICAL CONNECTION SOCKET STRUCTURE

(75) Inventor: Chuo-Hsing Chen, Keelung (TW)

(73) Assignee: Surtec Industries, Inc., Keelung (TW)

( * ) Notice: Subject to any disclaimer, the term of this patent is extended or adjusted under 35 U.S.C. 154(b) by 0 days.

(21) Appl. No.: 12/051,211

(22) Filed: Mar. 19, 2008

(51) Int. Cl.
*H01R 12/00* (2006.01)

(52) U.S. Cl. .................................... 439/76.1

(58) Field of Classification Search ............... 439/76.1, 439/535, 540.1, 76.2, 676
See application file for complete search history.

(56) References Cited

U.S. PATENT DOCUMENTS

| | | | | |
|---|---|---|---|---|
| 5,703,754 A * | 12/1997 | Hinze | .......................... | 361/736 |
| 6,547,572 B1 * | 4/2003 | Burdick | ..................... | 439/76.2 |
| 7,037,124 B2 * | 5/2006 | Lee et al. | .................... | 439/157 |
| 7,137,823 B2 * | 11/2006 | Naganishi | .................... | 439/34 |
| 7,357,650 B2 * | 4/2008 | Sasaki et al. | ............... | 439/76.2 |
| 7,367,850 B1 * | 5/2008 | Chang | ........................ | 439/676 |
| 7,375,981 B2 * | 5/2008 | Dickson | ..................... | 361/803 |
| 2002/0022387 A1 * | 2/2002 | Sumida | ..................... | 439/76.2 |
| 2002/0102871 A1 * | 8/2002 | Deep et al. | ................. | 439/76.2 |
| 2003/0157818 A1 * | 8/2003 | Meersschaut | ............. | 439/76.2 |
| 2005/0186838 A1 * | 8/2005 | Debenedictis et al. | .... | 439/540.1 |
| 2008/0113530 A1 * | 5/2008 | Sakamoto | .................. | 439/76.2 |

* cited by examiner

*Primary Examiner*—Hae Moon Hyeon
*Assistant Examiner*—Harshad C Patel
(74) *Attorney, Agent, or Firm*—Apex Juris, PLLC; Tracy M Heims

(57) ABSTRACT

An electrical connection socket structure is configured in a case on a wall. The structure includes a housing, a circuit board and a back plate. The housing and the back plate are made of a plastic material. The circuit board and the back plate are closely stacked on one side of the housing, and an edge of the housing and a back side of the back plate urge the case. Slanted side surfaces at an edge of the back plate urge slanted protruding ribs at an inner side of the housing. Therefore, an external force applied to the housing can be uniformly guided to the case by the back plate, thereby strengthening the structure of the connection socket.

16 Claims, 13 Drawing Sheets

ELECTRICAL CONNECTION SOCKET STRUCTURE

BACKGROUND OF THE INVENTION

1. Field of Invention

The present invention relates to an electrical connector device for signal leads, and more particularly to an electrical connection socket structure for connecting signal leads.

2. Related Art

Networks and telephones are indispensable tools in people's daily life. So currently, many wired communication systems, for example, networks or telephone systems have been planned no matter in dwelling houses or office area. Communication cables (e.g. network or telephone lines) wired in the building are disposed on a socket panel and exposed outside the wall through. One end of the connector is electrically connected to the communication cables in the building, and the other end has a slot exposed outside the socket panel. Signal leads of telephones, computers, printers, and other electronic devices may be inserted into the slots of the connectors, so as to be connected to the communication cables in the building by the use of the connectors. Common socket panels are mostly separate and scattered on the walls, and this manner may better meet the demands of common family subscribers. In situations of large number of subscribers in a family or office area, for the comprehensive arrangement of the network or telephone lines, the network or the telephone lines are integrated in a gather box. A signal line connection socket similar to the socket panel may be disposed in the gather box, for connecting the communication cables in the building and the signal leads of the electronic devices.

The signal line connection socket is constituted by a front plate and a circuit board. An edge of the front plate is fixed on the gather box, and the circuit board is directly locked on the back side of the front plate through screws. The circuit board has terminal blocks having a plurality of insulation displacement connection terminals (IDC terminals) and connector slots electrically connected with contact terminals of the IDC terminals. Both the terminal blocks and the connector slots are exposed outside the front plate. The IDC terminals are provided for the connection of the communication cables in the building, and the connector slots are provided for the connection of the signal leads of the electronic devices. Thus, the electronic devices are electrically connected to the communication cables through the signal line connection socket. The process of installing the communication cables to the IDC terminals is usually called "wiring" in the industry. That is, the communication cables are pressed to insert in the IDC terminals by the use of a tool, so as to cut a superficial plastic insulating layer on the cables, such that the IDC terminals contact the metal wires in the cables and the cables fix at the same time. During the process of wiring, the terminal blocks may suffer the external force repetitively, and the external force is transferred to the front plate via the circuit board. Moreover, if the operation is improper, the tool may directly hit the front plate, and the front plate endures most of the external force in the wiring process. So, the structural strength and durability of the front plate become especially important.

In order to enhance the structural strength and the durability of the front plate, the front plates of most of the signal line connection sockets are made of a metal material, such that the front plate can pass the standard intensity test. However, the cost of the metal material is considerably expensive, and the manufacturing procedure is quite difficult. For example, the metal processing procedure, such as turning and punching, must be adopted to form the finished products, and thus the production cost is considerably expensive. Therefore, the cost of the front plate made of the metal material cannot be effectively reduced, such that the price of the signal line connection sockets is quite expensive.

SUMMARY OF THE INVENTION

In view of the problem of a high cost of the front plate of the signal connection socket made of metal, the present invention is mainly directed to an electrical connection socket structure, so as to maintain a considerable reliability and to reduce the manufacturing cost of the connection socket.

In order to achieve the above objective, the present invention provides an electrical connection socket structure configured to be disposed in a case. The case is an electrical control cabinet fixed on the wall. The electrical connection socket structure includes a housing, a circuit board, and a back plate. The housing and the back plate are made of a plastic material. The housing is disposed in the case and has a front plate and a plurality of side plates extending from the front plate. The front plate has a plurality of openings, and the side plates urge the case. A plurality of protruding ribs is disposed at inner sides of the side plates, and an end edge of each protruding rib has an end surface inclined to the side plates. The circuit board is stacked on an inner side of the front plate and is accommodated in the housing. A plurality of electrical connection ports are electrically disposed on one side of the circuit board, and the electrical connection ports penetrate out of the front plate via the corresponding openings on the front plate. The back plate is stacked on the other side of the circuit board, and is accommodated in the housing. One side of the back plate has a plurality of bumps urging the circuit board, and the other side of the back plate urges the case. Edges of the back plate has a plurality of slanted side surfaces, and the side surfaces urge the end surfaces of the protruding ribs on the side plate.

The present invention has the effect that the front plate, the circuit board, and the back plate closely urge one another, and the side plates closely urge the side surfaces of the back plate through the protruding ribs. Further, the side plates and the back plate closely urge the case, such that the external force applied on the front plate can be dispersed to the back plate and the housing. Under the circumstance that the end surfaces of the protruding ribs are inclined to and urge the side surfaces of the back plate, the back plate can be used to increase the stress area and to scatter the concentrated external force, thereby enhancing the structural strength of the plastic material connection socket. In addition, the housing and the back plate can be made of the plastic material with lower cost through the one-time injection molding process, thereby reducing the manufacturing cost while maintaining a well reliability of the connection socket.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
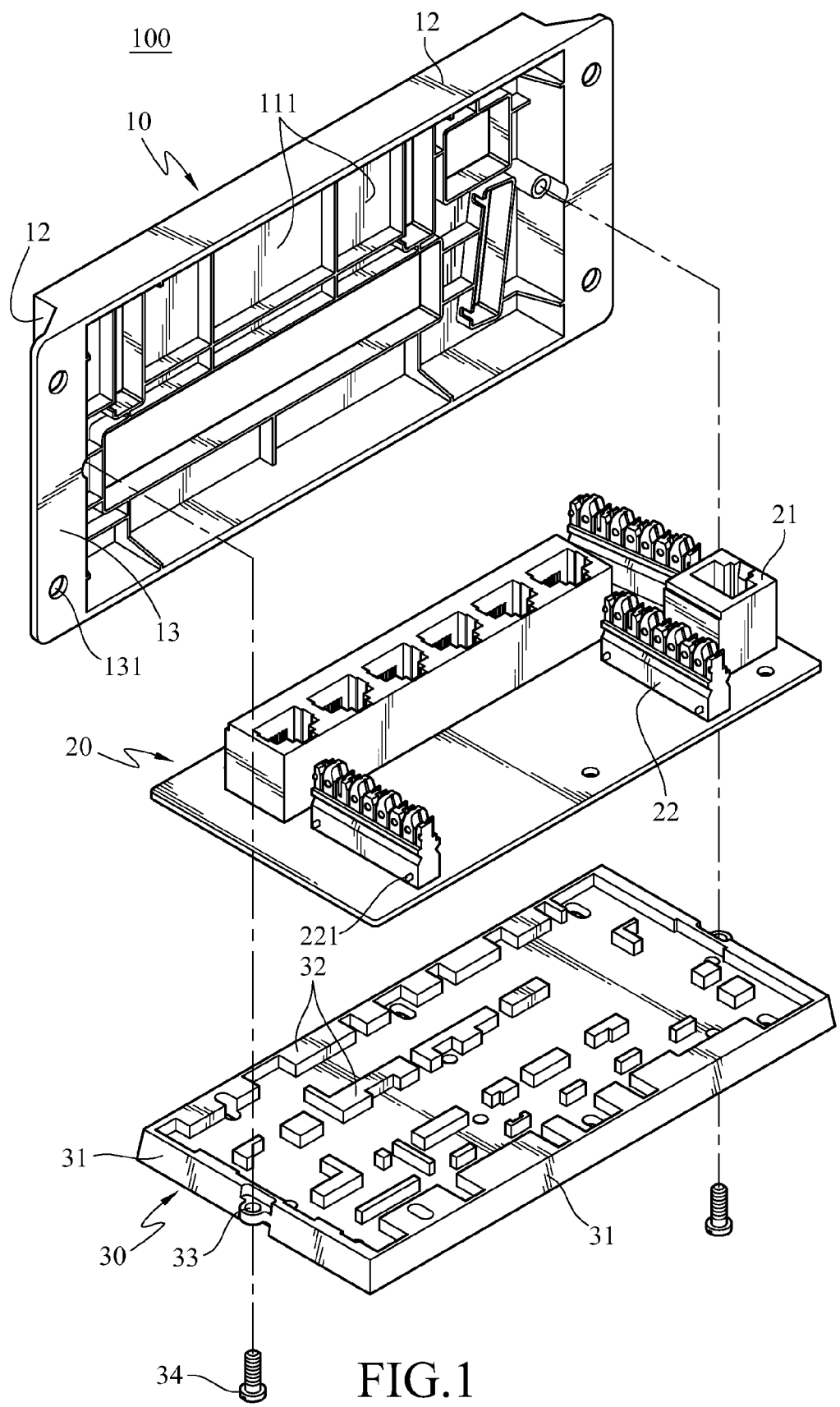
FIG. 1 is a three-dimensional exploded view of a housing, a circuit board, and a back plate of a first embodiment of the present invention.

The objectives, structures, features, and functions of the present invention will become apparent from the detailed description of the embodiments given hereinafter.

Referring to FIGS. 1 to 5, a first embodiment of an electrical connection socket structure of the present invention is shown. An electrical connection socket structure 100 is configured to be disposed in a case 50. The case 50 is a common electrical control cabinet fixed on a wall and has a base plate. The base plate has a plurality of arranged fixing holes 51, and the electrical connection socket structure 100 is fixed in the case 50 through a plurality of fixing members 60. The electrical connection socket structure 100 includes a housing 10, a circuit board 20, and a back plate 30. The housing 10 and the back plate 30 are made of the plastic material. Therefore, a desired form and structure of the housing 10 and the back plate 30 may be obtained through the one-time injection molding process, such that the material and processing costs of the electrical connection socket structure 100 are lower than those made of the metal material.

Figure 2:
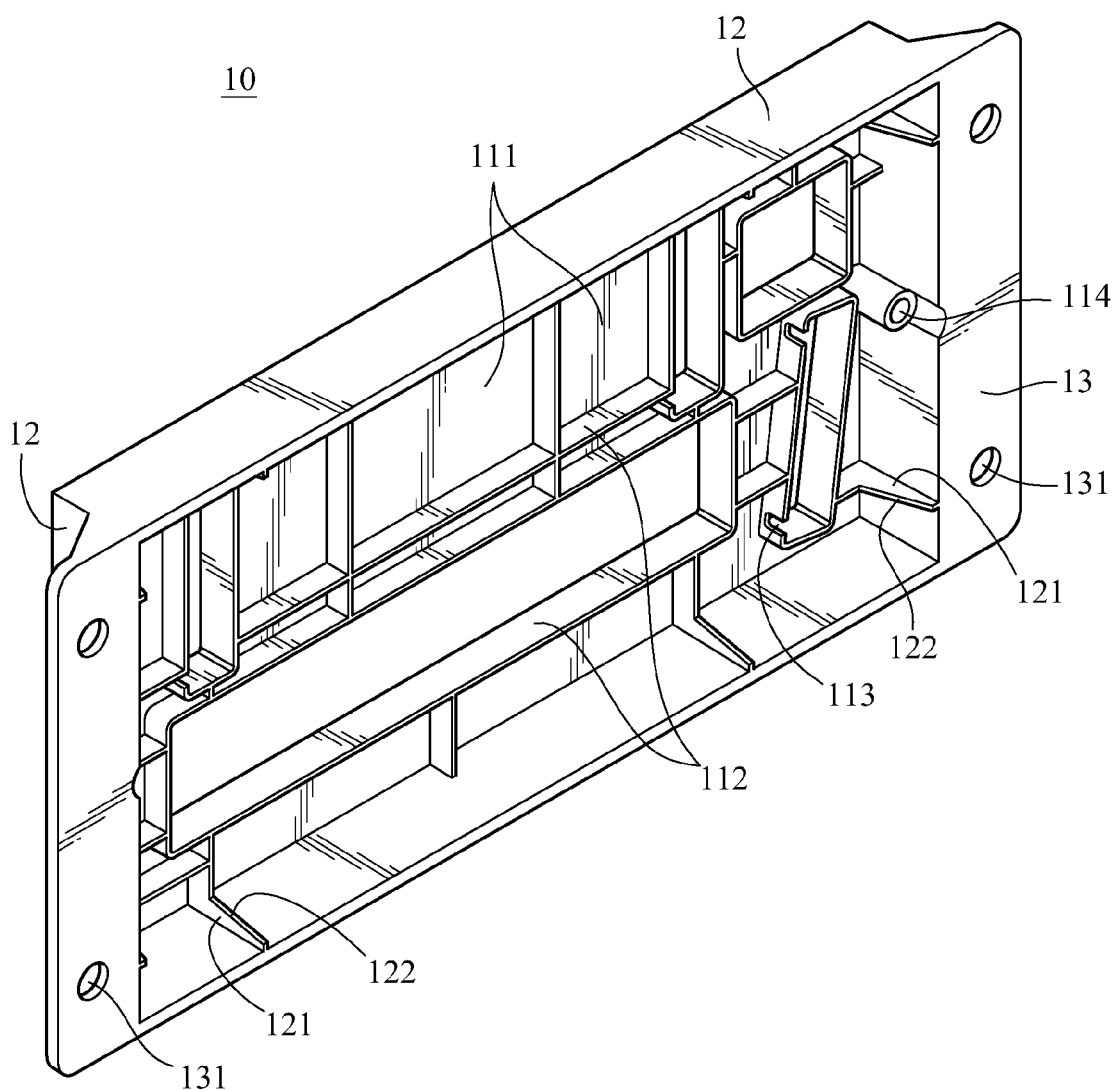
FIG. 2 is a schematic three-dimensional view of the housing of the first embodiment of the present invention.
Figure 3:
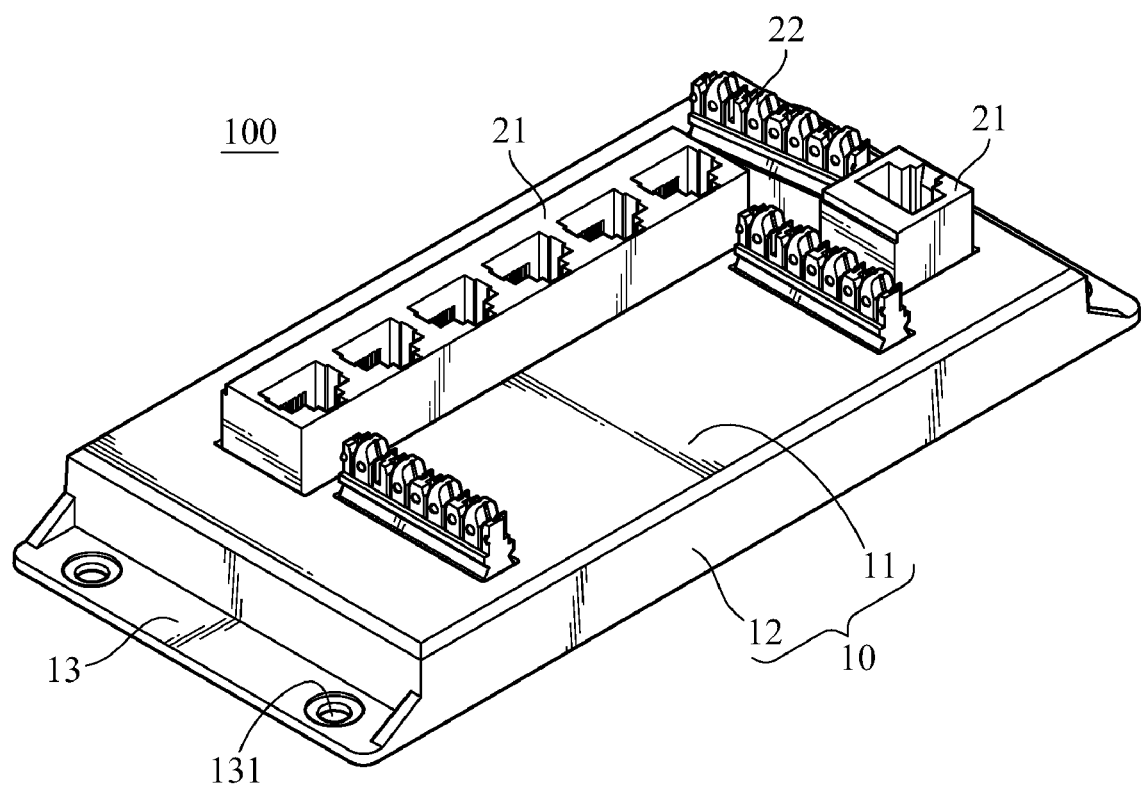
FIG. 3 is a schematic three-dimensional view of the first embodiment of the present invention.
Figure 4:
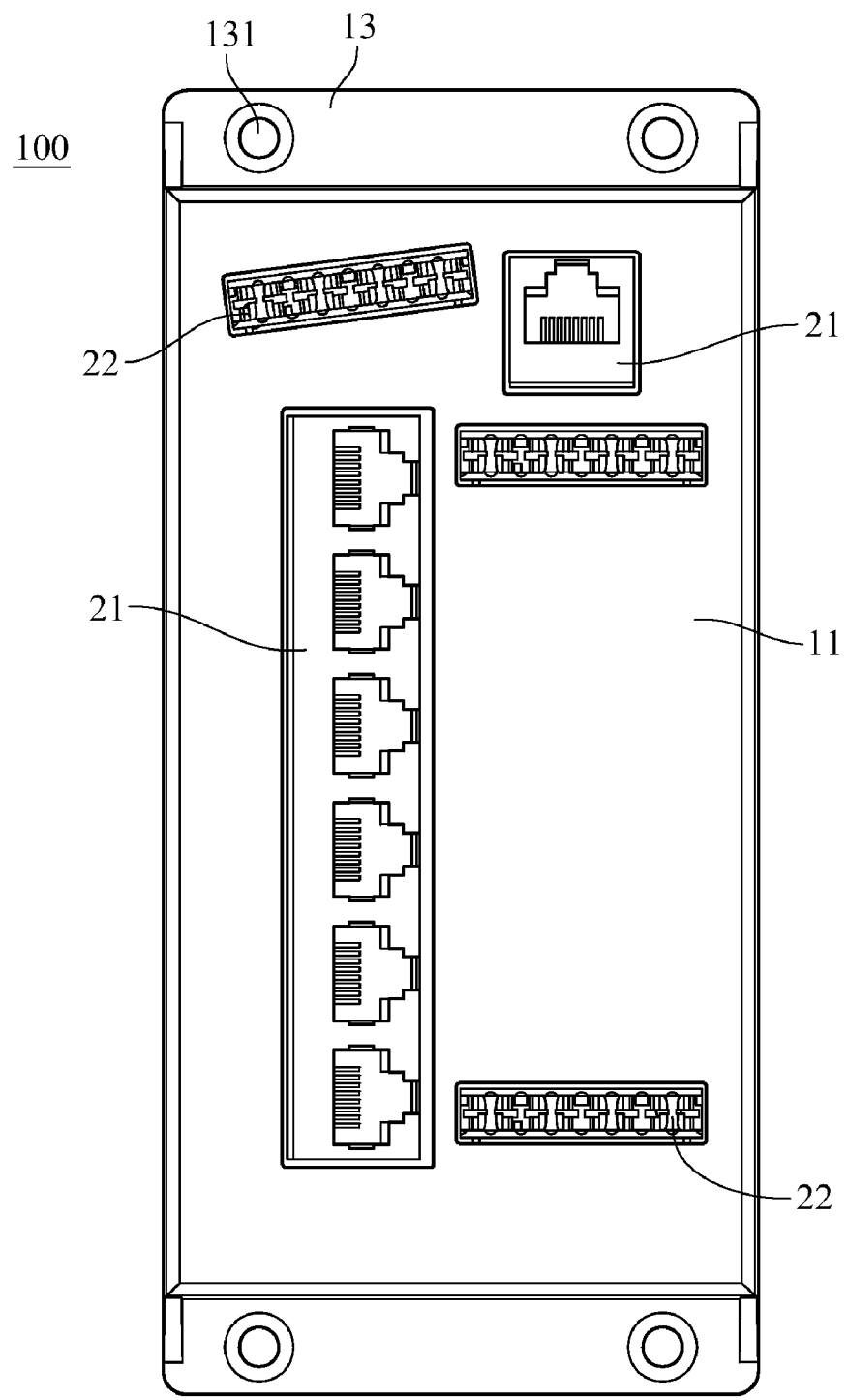
FIG. 4 is a top view of the first embodiment of the present invention.
Figure 5:
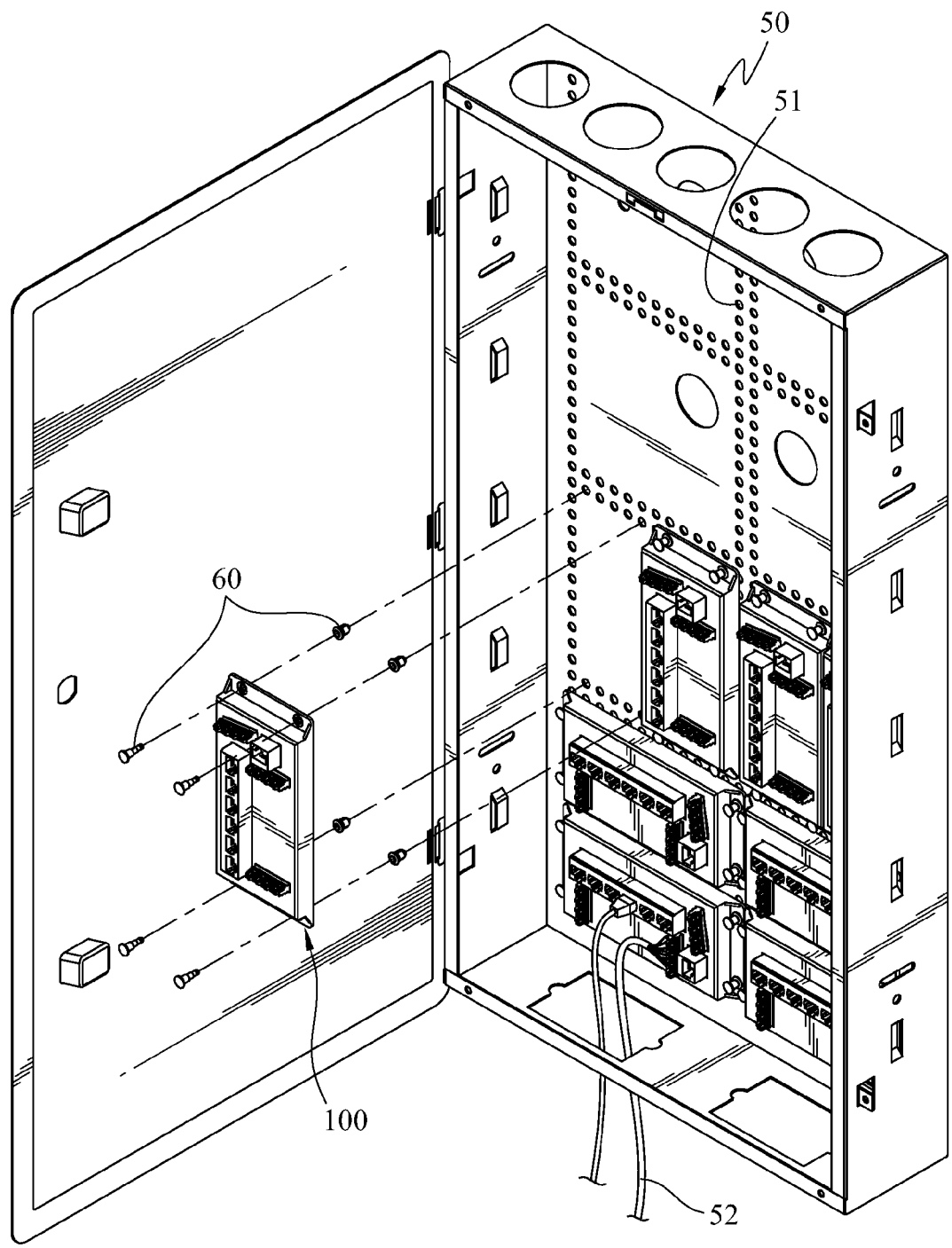
FIG. 5 is a schematic three-dimensional view of an electrical connection socket structure assembled in a case according to the first embodiment of the present invention.

Referring to FIGS. 1, 2, and 5, the housing 10 is first assembled with the circuit board 20 and the back plate 30, and then is disposed together with the circuit board 20 and the back plate 30 in the case 50. The housing 10 has a front plate 11 and a plurality of side plates 12 extending from the front plate 11. The side plates 12 surround one side of the front plate 11 to form an open space for accommodating the circuit board 20 and the back plate 30. The front plate 11 has a plurality of openings 111, and an edge of each opening 111 extends towards the housing 10 to form an annular rib 112. Some of the annular ribs 112 have at least one notch 113, and the number of the notches 113 is, for example, two in this embodiment, but the number is not limited to the drawings. Two screw holes 114 are disposed at the junction of the inner side of the front plate 11 and the side plates 12, and each screw hole 114 is adjacent to the inner side of the two opposite side plates 12. The side plates 12 are connected to four edges of the front plate 11, and the two opposite side plates 12 respectively have a wing plate 13 extending out of the housing 10. When the housing 10 is assembled to the case 50, the side plates 12 and the wing plates 13 urge the case 50. A plurality of protruding ribs 121 is disposed at the inner side of the side plates 12, and the end edge of each protruding rib 121 has an end surface 122 inclined to the side plates 12, i.e., the wide side of the protruding ribs 121 is trapezoidal shaped. The protruding ribs 121 extend from the side plates 12 to the inner side of the front plate 11, and are connected to the corresponding annular ribs 112 on the edges of the openings 111. The wing plate 13 has a plurality of perforations 131, and the number of the perforations 131 is, for example, four in this embodiment, but the number is not limited to the drawings.

Referring to FIGS. 1, 3, 4, and 5, the circuit board 20 is closely stacked on the inner side of the front plate 11, and is accommodated in the housing 10. A plurality of electrical connection ports is electrically disposed on the circuit board 20 at the side facing the front plate 11. The electrical connection ports include a plurality of signal sockets 21 and a plurality of terminal blocks 22. The openings 111 on the front plate 11 of the housing 10 are disposed corresponding to each electrical connection port. Thus, the electrical connection ports may penetrate out of the front plate 11 through the corresponding openings 111 on the front plate 11, and the end edges of the annular ribs 112 urge the circuit board 20. The edges of a part of the electrical connection ports have at least one positioning block 221, and the number and the position of the positioning blocks 221 are corresponding to the notches 113 on the annular ribs 112. When the circuit board 20 is fabricated in the housing 10, the positioning blocks 221 are embedded into the notches 113, so as to position the circuit board 20 on the housing 10.

The circuit board 20 has a specific circuit layer, and the signal socket 21 is electrically connected to the corresponding terminal block 22 via the circuit layer on the circuit board 20. The signal socket 21 may be a network line socket or a telephone line socket, for the signal leads 52 having the standard plug to insert. The terminal block 22 has a plurality of insulation displacement connection terminals (IDC terminals), and the ends of the signal leads 52 is directly pressed into the corresponding piercing terminals by means of wiring. Therefore, the electrical signal may be transmitted between the corresponding signal socket 21 and the IDC terminals of terminal block 22 via the circuit board 20, such that the signal leads 52 inserted into the signal socket 21 can be electrically connected to the signal leads 52 connected to the terminal block 22. In this embodiment, two signal sockets 21 and three terminal blocks 22 are disposed on the circuit board 20, but the number and the position of the signal sockets and the terminal blocks can be adjusted according to practical requirements, which does not intend to limit the scope of the present invention.

Figure 6:
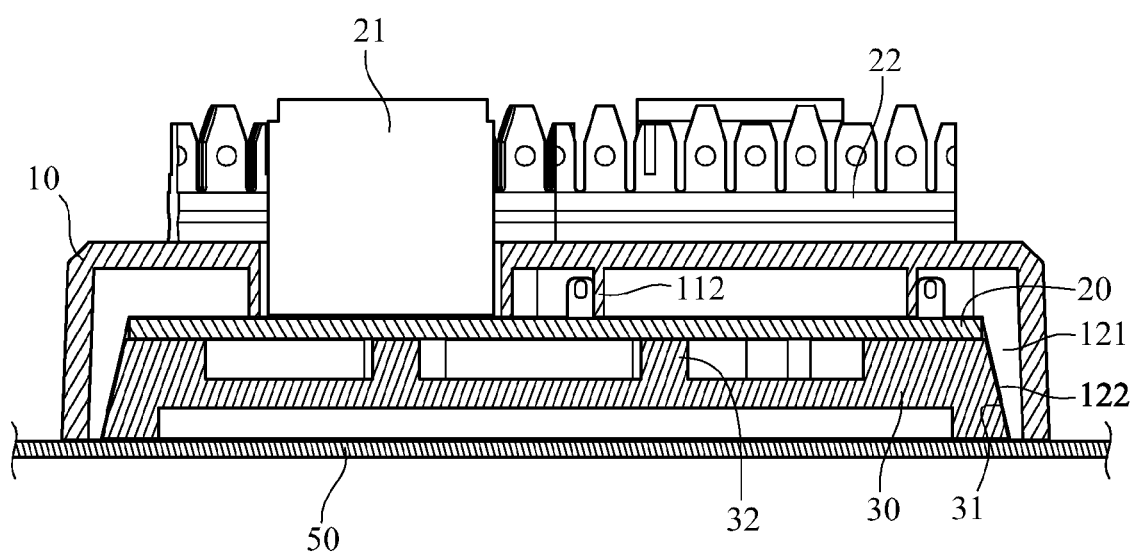
FIG. 6 is a schematic partial cross-sectional view of the electrical connection socket structure and the case according to the first embodiment of the present invention.
Figure 7:
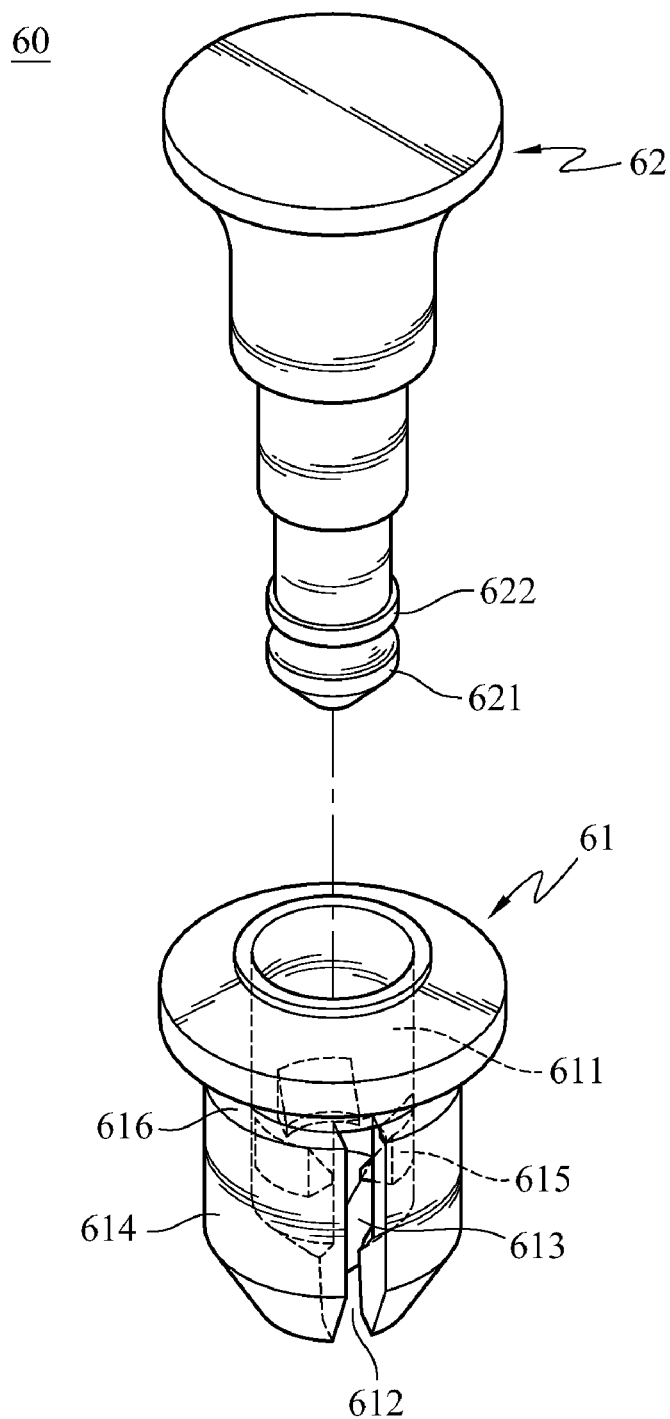
FIG. 7 is a three-dimensional exploded view of fixing members of the first embodiment of the present invention.
Figure 8:
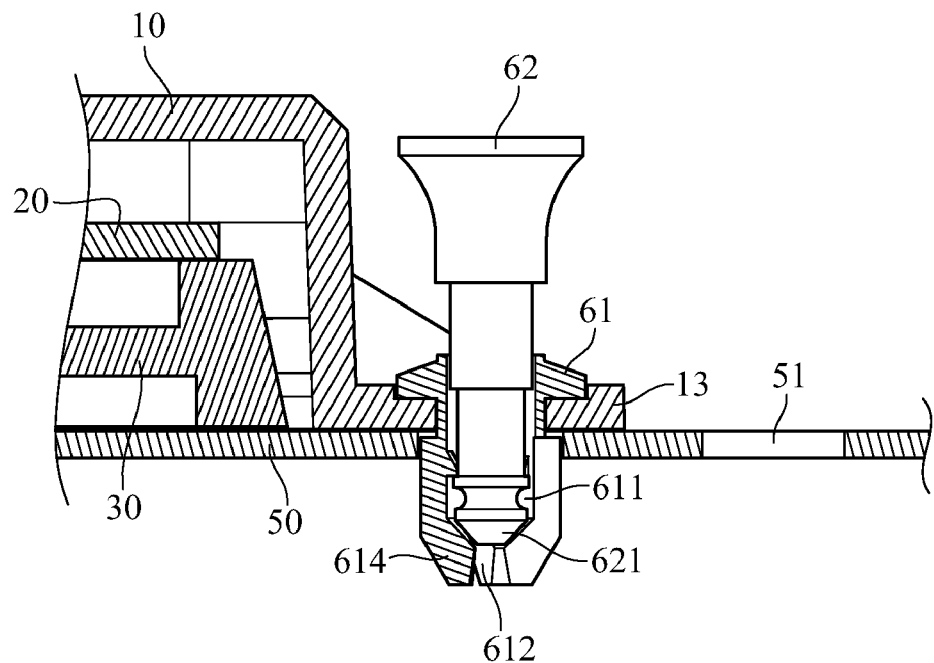
FIG. 8 is a schematic partial cross-sectional view of the electrical connection socket structure and the case according to the first embodiment of the present invention.
Figure 9:
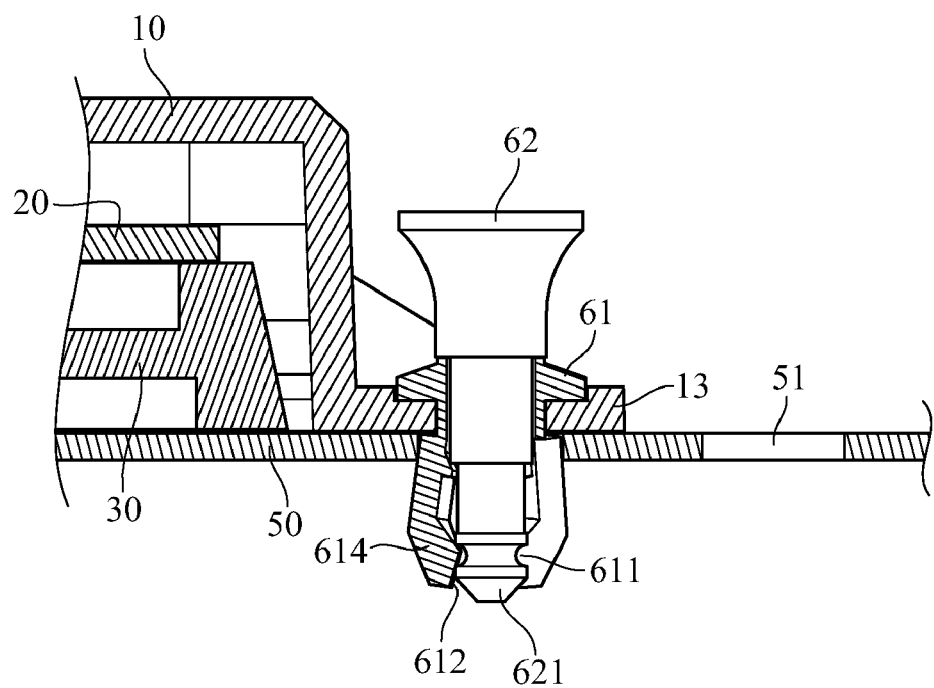
FIG. 9 is a schematic partial cross-sectional view of the electrical connection socket structure and the case according to the first embodiment of the present invention.

Referring to FIGS. 1, 5, and 6, the back plate 30 is closely stacked on the other side of the circuit board 20, and is accommodated in the housing 10. When the electrical connection socket structure 100 is disposed in the case 50, the reverse side of the back plate 30 not facing the circuit board 20 also closely urges the case 50. The edge of the back plate 30 has a plurality of slanted side surfaces 31, and a plurality of bumps 32 urging the circuit board 20 is disposed on the back plate 30 at the side facing the circuit board 20. The position and form of the bumps 32 must not interfere with the solder joints of the circuit region of the circuit board 20 and the electrical connection ports, thereby supporting the circuit board 20 to resist the external force. The perforations 33 corresponding to the screw holes 114 may be disposed on two corresponding side surfaces 31, and a plurality of screwing parts 34 pass through the back plate 30 via the perforations 33 and is screwed in screw holes 114 of the housing 10, such that the back plate 30 is locked to the housing 10 and presses the circuit board 20. It can be known that the two sides of the circuit board 20 closely urge the front plate 11 and the back plate 30 of the housing 10 respectively, and the two sides of the back plate 30 also closely urge the circuit board 20 and the case 50 respectively. Thus, the housing 10, the circuit board 20, the back plate 30, and the case 50 form the stacked structure. Therefore, the external force applied to the housing 10 may be dispersed by the side plates 12, the circuit board 20, and the back plate 30 and transferred to the case 50.

When the back plate 30 is installed on the housing 10, the side surfaces 31 of the back plate 30 may urge the end surfaces 122 of the protruding ribs 121 on the side plates 12. In addition, the side surfaces 31 and the end surfaces 122 have the same slope and are inclined to the side plates 12, so the external force endured by the side plates 12 can be transferred onto the back plate 30 through the protruding ribs 121 and the side surfaces 31. Thus, the back plate 30 endures the pressure from the front plate 11 pressed on the circuit board 20, and the pressure from the side plates 12, and then transfers the pressures to the case 50, so as to uniformly distribute the force among the components. Compared with the manner of disposing the side plates 12 not inclined to and urging the side plates 12, the electrical connection socket structure 100 of the present invention can have a higher structural strength and reliability when the side surfaces 31 and the protruding ribs 121 are disposed, thereby solving the problem that the structural strength is lowered if the plastic material is adopted instead of the metal material.

Referring to FIGS. 3, 5, 7, 8, and 9, the fixing members 60 pass through the wing plates 13 of the housing 10 via the perforations 131 and are inserted into the fixing holes 51 of the case 50, so as to fix the housing 10 together with the circuit board 20 and the back plate 30 in the case 50. Each fixing member 60 includes a sleeve 61 and a latch 62, and the fixing members 60 are also made of the plastic material.

The sleeve 61 has a penetrating wide-section hole 611 and narrow-section hole 612 which are connected. An inner edge of the wide-section hole 611 has a plurality of retaining ribs 615. A front end of the sleeve 61 has a plurality of axial cutting grooves 613, and the cutting grooves 613 divide the front end of the sleeve 61 into a plurality of expansion sheets 614. A front end of the latch 62 has a tapered portion 621, and a middle section of the latch 62 has an annular flange 622. The sleeve 61 has an outer annular slot 616 on its periphery. The sleeve 61 passes through the perforations 131 of the wing plate 13 and the fixing hole 51 of the case 50, and the edge of the perforation 131 of the wing plate 13 is embedded into the outer annular slot 616. The latch 62 is inserted into the sleeve 61 from the wide-section hole 611. A diameter of the annular flange 622 is slightly larger than the distance of the retaining ribs 615, so when the tapered portion 621 is inserted into the bottom of the wide-section hole 611, the retaining rib 615 may lock the annular flange 622, such that the latch 62 cannot exit from the wide-section hole 611. When the latch 62 moves forward to make the tapered portion 621 to be embedded into the narrow-section hole 612, the expansion sheet 614 may be pushed by the tapered portion 621 to deform outward to urge the fixing holes 51 of the case 50, such that the junction of the wide-section hole 611 and the narrow-section hole 612 is embedded between the annular flange 622 and the tapered portion 621 of the latch 62. Therefore, the sleeve 61 and the latch 62 cannot depart from the fixing holes 51 of the case 50, so as to fix the housing 10 in the case 50.

Figure 10:
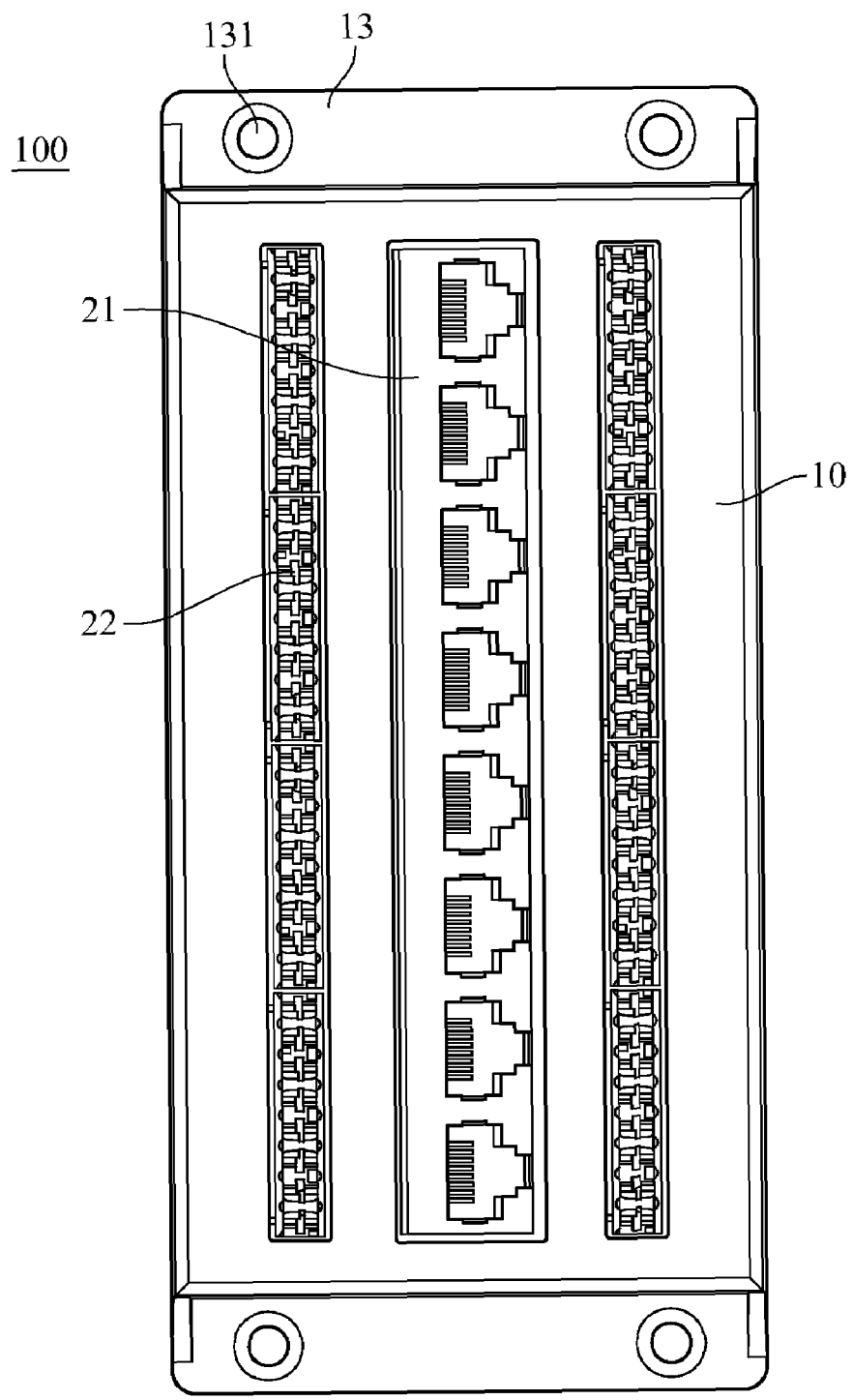
FIG. 10 is a top view of a second embodiment of the present invention.

Referring to FIG. 10, a second embodiment of the electrical connection socket structure of the present invention is shown. The specific implementation method is similar to that of the first embodiment, but differs therefrom that the electrical connection port of this embodiment includes one signal socket 21 and two terminal blocks 22, and the housing 10 has a different form accordingly.

Figure 11:
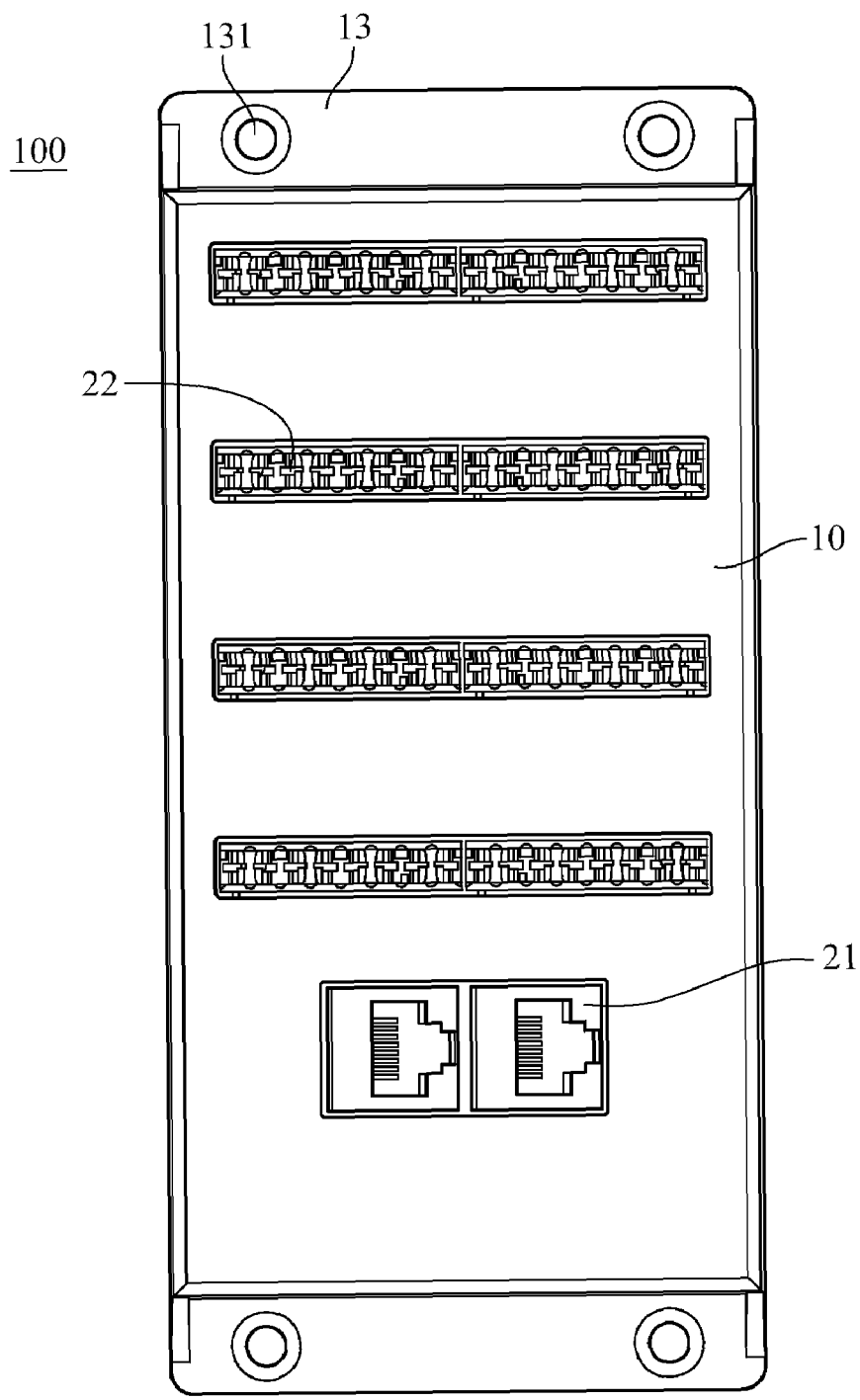
FIG. 11 is a top view of a third embodiment of the present invention.

Referring to FIG. 11, a third embodiment of the electrical connection socket structure of the present invention is shown. The specific implementation method is similar to that of the first embodiment, but differs therefrom that the electrical connection port of this embodiment includes one signal socket 21 and four terminal blocks 22, and the housing 10 has a different form accordingly.

Figure 12:
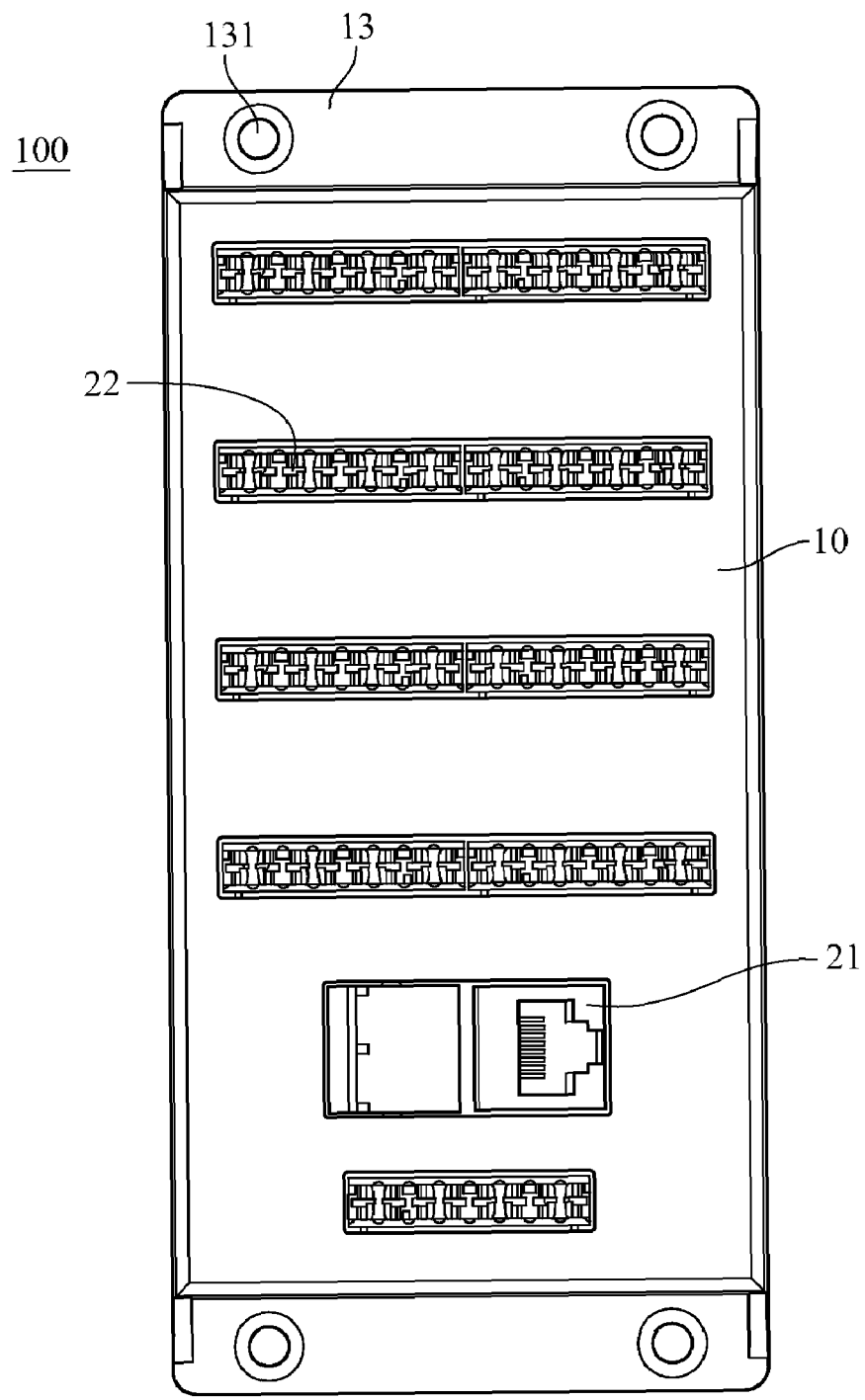
FIG. 12 is a top view of a fourth embodiment of the present invention.

Referring to FIG. 12, a fourth embodiment of the electrical connection socket structure of the present invention is shown. The specific implementation method is similar to that of the first embodiment, but differs therefrom that the electrical connection port of this embodiment includes one signal socket 21 and five terminal blocks 22, and the housing 10 has a different form accordingly.

Figure 13:
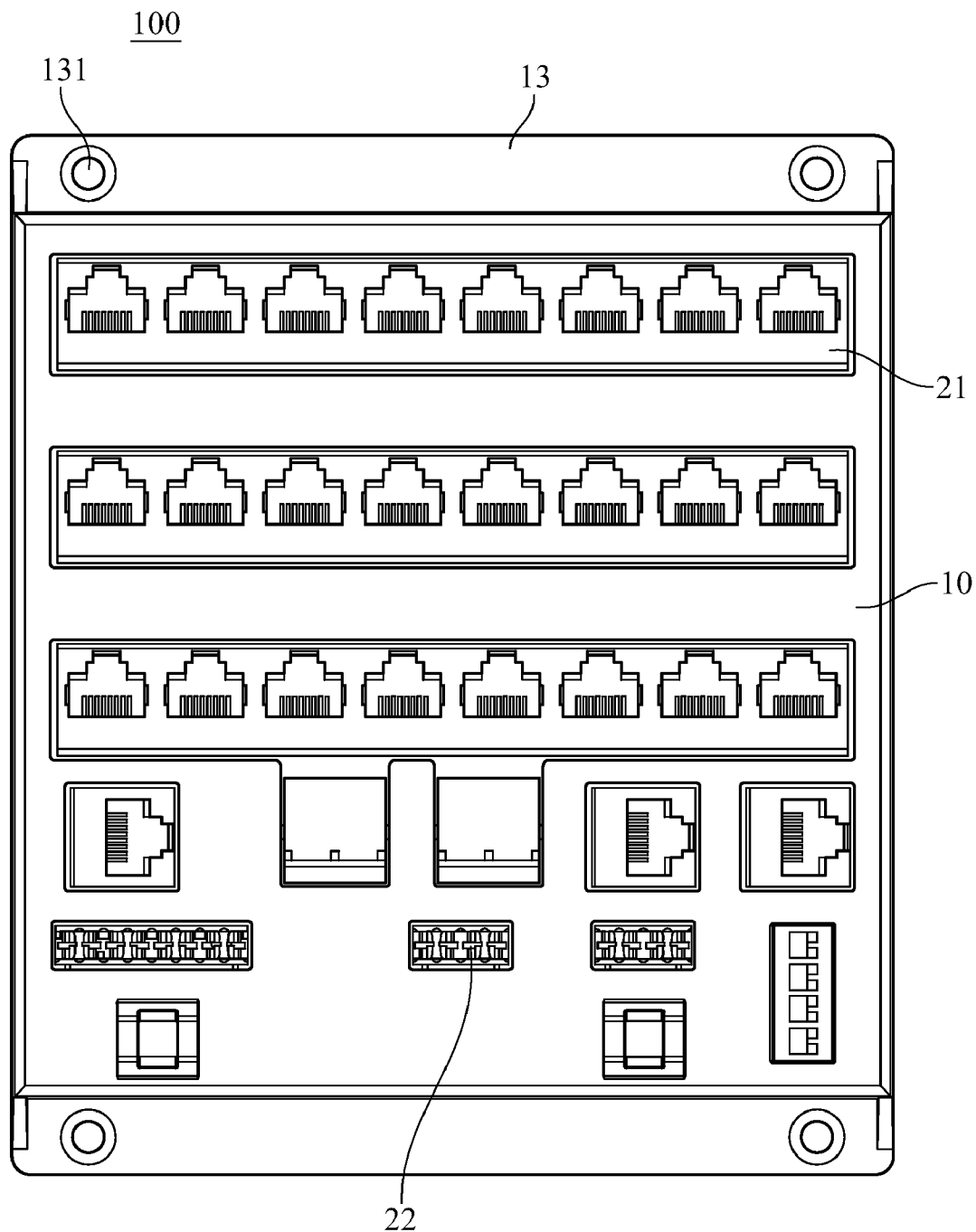
FIG. 13 is a top view of a fifth embodiment of the present invention.

Referring to FIG. 13, a fifth embodiment of the electrical connection socket structure of the present invention is shown. The specific implementation method is similar to that of the first embodiment, but differs therefrom that the electrical connection port of this embodiment includes seven signal socket 21 and three terminal blocks 22, and the housing 10 has a different form accordingly.

Figure 14:
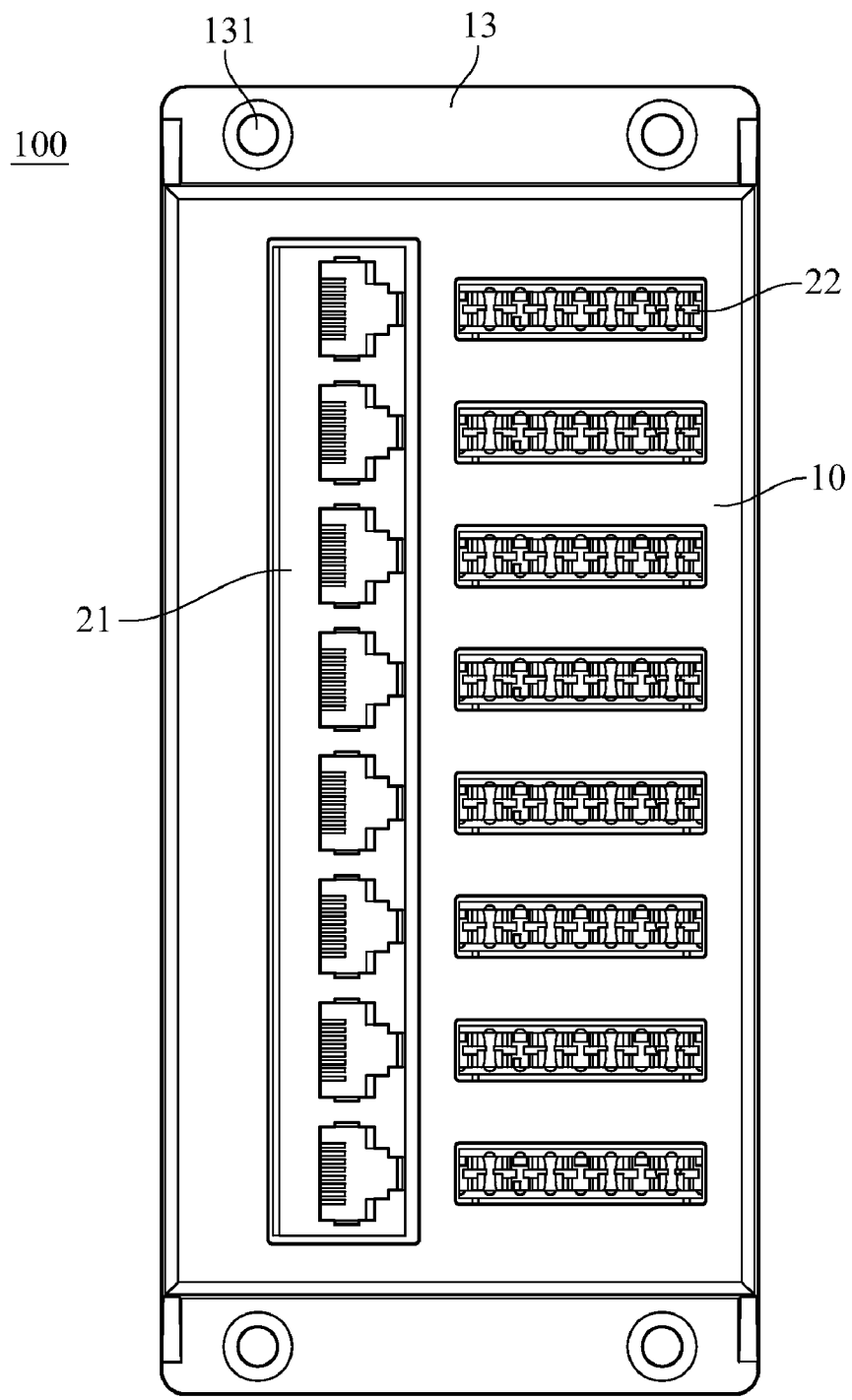
FIG. 14 is a top view of the sixth embodiment of the present invention.

Referring to FIG. 14, a sixth embodiment of the electrical connection socket structure of the present invention is shown. The specific implementation method is similar to that of the first embodiment, but differs therefrom that the electrical connection port of this embodiment includes one signal socket 21 and eight terminal blocks 22, and the housing 10 has a different form accordingly.

In the present invention, the front plate, the circuit board, and the back plate closely urge with one another, and the side plates closely urge the side surfaces of the back plate by the use of the protruding ribs. Further, the side plates and the back plate also closely urge the case, such that the external force applied to the front plate can be dispersed to the back plate and the housing. Under the circumstance that the end surfaces of the protruding ribs are inclined to and urge the side surfaces of the back plate, the back plate can be used to increase the stress area and to scatter the concentrated external force, thereby enhancing the structural strength of the plastic material connection socket. In addition, the housing and the back plate can be made of the plastic material with lower cost through the one-time injection molding process, thereby reducing the manufacturing cost while maintaining a good reliability of the connection socket.

What is claimed is:

1. An electrical connection socket structure, configured to be disposed in a case, comprising:

a housing, disposed in the case and having a front plate and a plurality of side plates extending from the front plate, wherein the front plate has a plurality of openings, the side plates urge the case, a plurality of protruding ribs is arranged at inner sides of the side plates, and an end edge of each protruding rib has an end surface inclined to the side plates;

a circuit board, stacked on an inner side of the front plate and accommodated in the housing, wherein a plurality of electrical connection ports is electrically disposed on one side of the circuit board, and the electrical connection ports penetrate out of the front plate via the corresponding openings; and a back plate, stacked on the other side of the circuit board and accommodated in the housing, wherein a plurality of bumps urging the circuit board is disposed on one side of the back plate, and the other side of the back plate urges the case, an edge of the back plate has a plurality of slanted side surfaces, and the side surfaces urge the end surfaces of the protruding ribs.

2. The electrical connection socket structure as claimed in claim 1, wherein edges of each opening extend into the housing to form an annular rib, and an end edge of the annular ribs urge the circuit board.

3. The electrical connection socket structure as claimed in claim 2, wherein an edge of the electrical connection ports has at least one positioning block, the annular ribs respectively have at least one notch, and the positioning blocks are embedded into the notches.

4. The electrical connection socket structure as claimed in claim 2, wherein the protruding ribs extend from the side plates to the front plate, and are connected to the corresponding annular ribs.

5. The electrical connection socket structure as claimed in claim 1, wherein two opposite side plates respectively have a wing plate extending out of the housing, the wing plates respectively have a plurality of perforations, a plurality of fixing members respectively passes through the wing plate via the perforations and is inserted into the case, so as to fix the housing, the circuit board, and the back plate onto the case.

6. The electrical connection socket structure as claimed in claim 5, wherein each of the fixing members comprises:
   a sleeve, passing through the perforations and the case, wherein the sleeve has a penetrating wide-section hole and narrow-section hole, a front end of the sleeve has a plurality of axial cutting grooves, and the cutting groove divides the front end of the sleeve in to a plurality of expansion sheets; and
   a latch, inserted into the sleeve via the wide-section hole, wherein a front end of the latch has a tapered portion, and the tapered portion is embedded into the narrow-section hole, such that the expansion sheet deforms outwards to urge the case.

7. The electrical connection socket structure as claimed in claim 6, wherein an inner edge of the wide-section hole has at least one retaining rib, a middle section of the latch has an annular flange, and a diameter of the annular flange is larger than a pitch of the retaining ribs.

8. The electrical connection socket structure as claimed in claim 6, wherein a periphery of the sleeve has an outer annular slot, and an edge of the perforations of the wing plates is embedded into the outer annular slot.

9. The electrical connection socket structure as claimed in claim 1, wherein the housing and the back plate are made of a plastic material.

10. The electrical connection socket structure as claimed in claim 1, further comprising a plurality of screwing parts, and each of the screwing part passes through the back plate and is screwed in the housing, so as to lock the back plate to housing.

11. An electrical connection socket structure, comprising:
   a housing, having a front plate and a plurality of side plates extending from the front plate, wherein the front plate has a plurality of openings, a plurality of protruding ribs is arranged at an inner side of the side plates, and an end edge of each protruding rib has an end surface inclined to the side plates;
   a circuit board, stacked on an inner side of the front plate and accommodated in the housing, wherein a plurality of electrical connection ports is electrically disposed on one side of the circuit board, the electrical connection ports penetrate out of the front plate via the corresponding openings; and
   a back plate, stacked on the other side of the circuit board and accommodated in the housing, wherein the back plate has a plurality of bumps urging the circuit board, an edge of the back plate has a plurality of slanted side surfaces, and the side surfaces urge the end surfaces of the protruding ribs.

12. The electrical connection socket structure as claimed in claim 11, wherein edges of each opening respectively extends into the housing to form an annular rib, and an end edge of the annular ribs urges the circuit board.

13. The electrical connection socket structure as claimed in claim 11, wherein an edge of the electrical connection ports has at least one positioning block, the annular ribs respectively have at least one notch, and the positioning blocks are embedded into the notches.

14. The electrical connection socket structure as claimed in claim 11, wherein the protruding ribs extend from the side plates to the front plate, and are connected to the corresponding annular ribs.

15. The electrical connection socket structure as claimed in claim 11, wherein the housing and the back plate are made of a plastic material.

16. The electrical connection socket structure as claimed in claim 11, further comprising a plurality of screwing parts, and the screwing parts pass through the back plate to be screwed in the housing, so as to lock the back plate to housing.

* * * * *